Patented Aug. 27, 1940

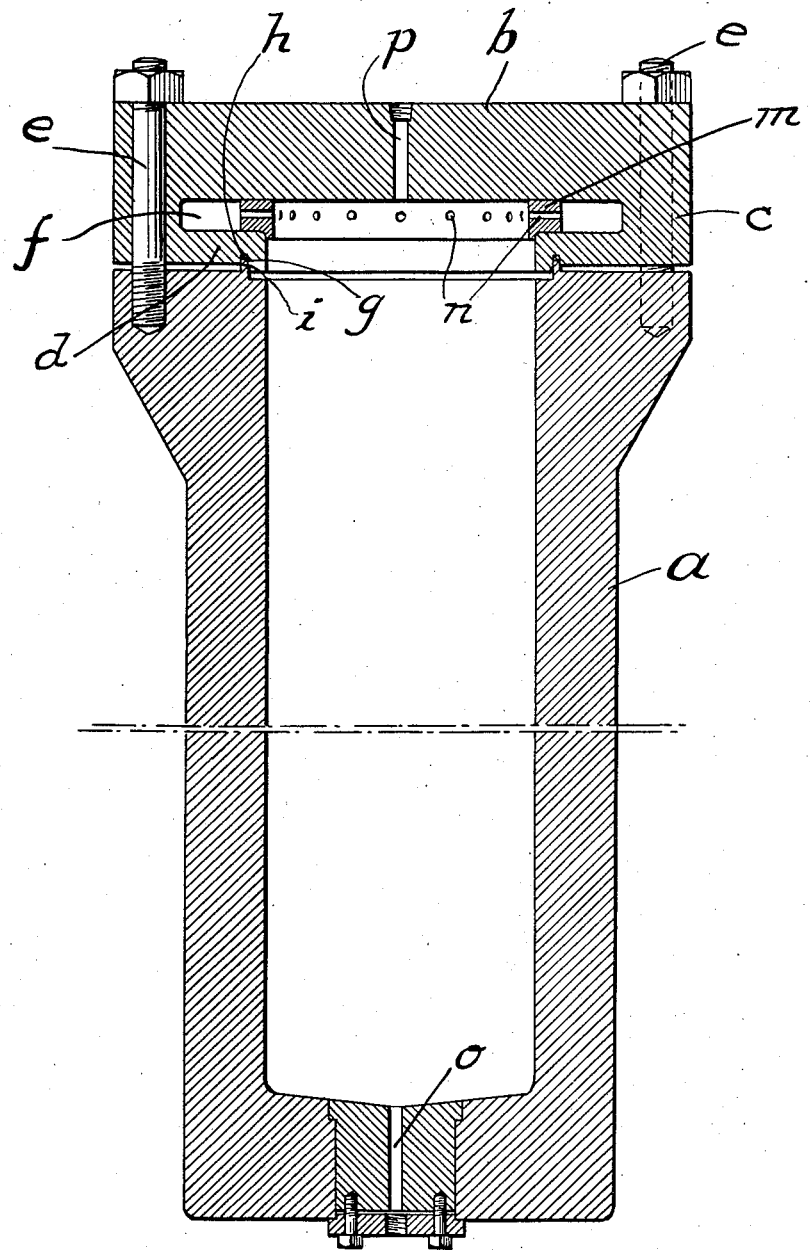

2,213,161

UNITED STATES PATENT OFFICE 2,213,161

CLOSURE FOR PRESSURE VESSELS

Gunnar Ericsson, Philadelphia, Pa.

Application October 13, 1936, Serial No. 105,364

1 Claim. (Cl. 220—3)

In the art of synthesizing chemicals, impregnating materials with gases, and in other analogous arts, it, in many instances, is necessary to perform the operation under superatmospheric pressure, such pressures varying from pressures slightly above atmospheric to pressures of many thousand pounds to the square inch. Such operations are necessarily conducted within a closed chamber which must be sealed against escape of contained materials. Since in many cases the chamber must be opened to receive the material or materials to be treated, synthesized, amalgamated or impregnated and to remove the finished product or replensh the catalyst, it must be provided with a removable closure, which must make an effective seal. It is also highly desirable that the closure should be capable of quick removal and replacement, since chambers of the kind specified are very expensive, and it is important, from the standpoint of economical operation, that they should not be out of operation for a substantial length of time between successive operations.

The object of the invention is to provide a chamber meeting the requirements above specified.

In an application filed by me jointly with John L. Cox, on the 18th day of July, 1936, Serial No. 91,356, now matured into Patent No. 2,133,934, there is described and illustrated a chamber having the desirable characteriistics above set forth and which, specifically, comprises a cylindrical body, an end closure or head and an intermediate flexible disc member confinable between the head and an internal shoulder on the body and provided with a peripheral flange extending downward and inward to thus form a pocket communicating with the interior of the cylinder. Compressible sealing means are provided between the opposing faces of the inwardly extending part of the flange and the shoulder on the body. The pressure in the pocket cooperates with said sealing means to maintain a fluid-tight seal between the inward extension of the flange and the shoulder on the body.

The present invention is an improvement upon, or simplification of, the construction disclosed in said joint application.

I have discovered that it is feasible to provide the head or closure with an integral downwardly and inwardly extending flange engaging the upper end of the cylindrical body and which will function in essentially the same way as does the flange on the intermediate flexible disc member of the structure of said Ericsson-Cox application; it having been found possible, as I have determined by experiment and practical use, to make this flanged member of the necessary strength and approximate rigidity and still provide the very limited but adequate flexibility required to enable the flanged member to be responsive to the pressure within the pocket and cooperate with the sealing means to maintain a fluid-tight joint between the chamber body and its closure.

A preferred embodiment of the invention is shown in the single figure of the drawing, which is a longitudinal sectional view of the chamber body with the removable closure in closed position.

The body of the chamber is a cylinder $a$ which is preferably (but not necessarily) of uniform internal diameter and whose external diameter is preferably (but not necessarily) enlarged at its upper end to provide an annular flat top of enlarged area. The closure is effected by means of a removable head $b$ which is of the same external diameter as the external diameter of the enlarged upper end of the chamber body. The head is provided with an integral circumferential flange which extends downward and thence inward. The outer face of the downwardly extending part $c$ of the flange is a continuation of the outer face of the main body of the head $b$ and, when applied to the chamber body, is flush with the outer face of its enlarged upper end. This downwardly extending part $c$ of the flanged member is of sufficient thickness to allow the passage therethrough of stud bolts $e$ for securing the head to the chamber body.

The inwardly extending part $d$ of the flanged member is spaced from the lower face of the main body of the head to form a pocket $f$. Formed in the lower face of the inwardly extending part $d$ of the flanged member is an annular groove $g$ in which is inserted a gasket $h$ of soft metal, for example. Extending from the upper face of the chamber body is an annular ridge $i$ aligning with the groove $g$ and, when the head is bolted in position on the chamber body, extending for a relatively small distance into said groove in pressure engagement with the gasket. It is obvious that the location of the ridge and groove may be the reverse of that described; that is, the ridge may be formed in the part $d$ and the groove in the upper face of the chamber body. By means of either arrangement, a resistance is afforded to the leakage or escape between the body $a$ and head $b$ of the fluid contents of the chamber.

Extending between the inner end of the element $d$ and the lower face of the body of the head $b$ is a ring $m$, which is provided with a number of radial holes $n$ so as to afford fluid communication between the interior of the chamber and the annular pocket $f$, so that the pocket is under the same pressure as the interior of the chamber. The ring need not be continuous throughout its circumference. It may be formed by a series of spaced apart imperforate blocks. It is practicable to make the ring of a convenient number of segmental sections in order to facilitate its application to working position. Conveniently, it may be made in three or four segments, which may fit snugly end to end or may be spaced somewhat apart but not sufficiently far apart to permit them to move inward a substantial distance; the segments being provided with radial perforations or surface grooves, and the segments are provided with means to prevent them from shifting radially outward, such as lips $m'$, extending downward from the inner lower edge of the segments and engaging the upper inner edge of the inwardly extending member $d$ of the flange $c, d,$ thereby insuring the maintenance of a uniform pressure over and all the way around the gasket $h$.

The force tending to lift the gasket $h$ from its seat (which force is the internal pressure multiplied by the area of the annulus between the gasket and the inner diameter of the element $d$) is only a fraction of the force tending to hold the gasket on its seat (which force is the internal pressure multiplied by the area of the annulus between the outer wall of the pocket $f$ and the inner diameter of the element $d$), thereby holding the gasket firmly on its seat. With a suitable ratio between these areas, as shown in the drawing, the effectiveness of the seal is independent of the pressure once a slight initial sealing has been effected by screwing up the nuts on the bolts $e$. Thus pressure is transmitted to the gasket $h$ through the ring $n$ and the element $d$. Thereafter the action is entirely automatic. If any pressure should leak beyond the gasket $h$, it is freely released, thereby avoiding building up a counter-pressure under that part of element $d$ outside the gasket.

The interior of the chamber may be supplied after closure with pressure fluid either through the orifice $o$ in the bottom of the cylindrical body $a$ or through the orifice $p$ in the head $b$. When the fluid is introduced through either orifice it may be exhausted through the other, or less desirably access to the interior of the cylinder can be had through an aperture traversing the thickened wall.

What I claim and desire to protect by Letters Patent is:

In a chamber adapted to be subjected to high superatmospheric pressure and which may be quickly opened and closed and which when closed will be secure against leakage and which comprises a cylindrical body open at its top, a closure having an integral circumferential flange extending downward and inward and overlying the upper end of the chamber body and forming between it and the closure head a circumferential open space, means to secure the closure against the body, and a spacing ring between the inner end of the inwardly extending member of the flange and the closure head and provided with openings allowing free fluid flow therethrough, the improvement which comprises an annular groove formed in one of the opposing faces formed by the upper end of the chamber body and said flange and positioned at a distance from the inner end of said circumferential open space which is short relative to its distance from the other end of said space, an annular ridge extending from the other of said opposing faces and adapted to engage with said groove, and a separable circumferential sealing means or gasket of relatively compressible material confinable within said groove; the radial thickness of said spacing ring being a fractional part of the radial depth of said space so as to form a circumferential pocket whose bottom is the inward extension of the flange and the vertical thickness of said spacing ring approximating the vertical depth of said pocket and thus being not substantially less than that required to fill the space between the closure and flange when the closure is secured against the body with sufficient force to compress said sealing means without great distortion of said flange, the vertical thickness of the spacing ring being also great enough to prevent closing of the annular space between said body and flange when the closure is so secured, the superatmospheric pressure in the pocket, when the chamber is in use, thus acting directly upon the inwardly extending part of the flange and maintaining a pressure tending to further compress the gasket on its seat multiple times the pressure tending to unseal the gasket.

GUNNAR ERICSSON.